May 3, 1932.  H. H. MILLER  1,856,923
DEVICE FOR MOUNTING GLASS, MIRRORS, ETC
Filed Oct. 15, 1928
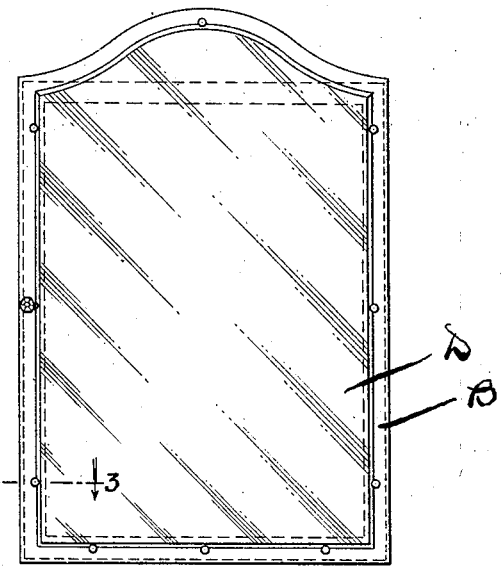
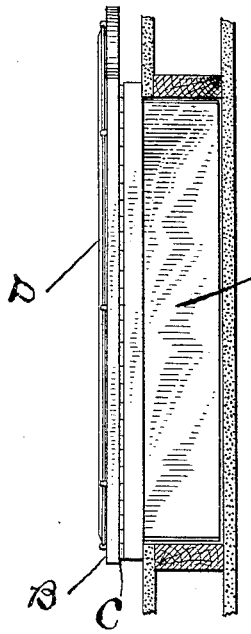
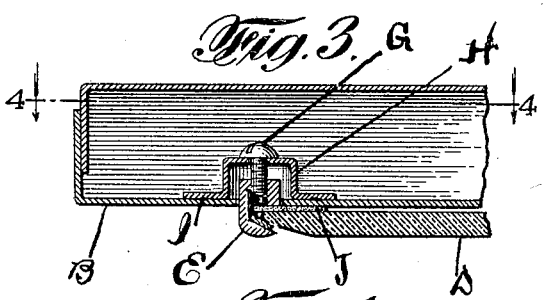
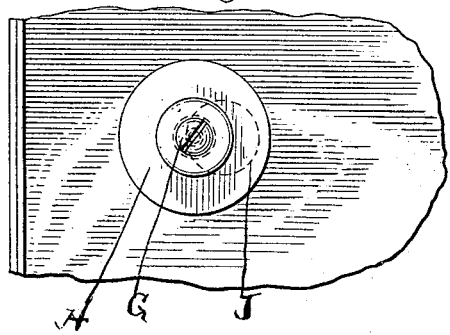
INVENTOR
Harley H. Miller
BY
Geo. W. Miller
ATTORNEY Patented May 3, 1932

1,856,923

UNITED STATES PATENT OFFICE

HARLEY H. MILLER, OF MIDDLETOWN, OHIO, ASSIGNOR TO THE MIAMI CABINET COMPANY, A CORPORATION OF OHIO

DEVICE FOR MOUNTING GLASS, MIRRORS, ETC.

Application filed October 15, 1928. Serial No. 312,417.

My invention relates to improvement in devices for mounting glass, mirrors, etc. and devices therefor.

By my invention I provide a mounting for a mirror adapted to support same, to provide air space between a mirror and the article upon which it is mounted, to provide means whereby mirrors of any desired shape or outline may be readily mounted, also to provide for expansion and contraction of the mirror or mounting without danger of breakage.

In the drawings Fig. 1 shows the front of a cabinet door. Fig. 2 is a side view of the cabinet. Fig. 3 is a cross section of a portion of the door showing the mirror and means for holding it in place and taken on the line 3, 3, of Fig. 1, and Fig. 4 is an enlarged view on the line 4, 4, of Fig. 3. Fig. 5 is a detail.

In the drawings in which like letters refer to like parts, A is the cabinet proper, B is a door mounted on the cabinet proper by the hinge C. D is a mirror. The door B as shown consists of two metal plates having oppositely extending flanges telescoped together as shown in Fig. 3. E is a button having a screw threaded opening into which the screw G is adapted to engage. This button E as shown is cylindrical, although it may be of any desired shape either rectangular or may be an elongated button or of any fanciful shape. The button is provided with a slot extending across the button below the head and so arranged and of such form that it may extend over opposite surfaces of the mirror D. As shown, the slot in the button E is arranged so that the outer portion of the slot is beveled to correspond with the bevel on the mirror D, while the lower portion of the slot is arranged parallel to the lower side of the mirror D. This slot is preferably of such size that sufficient space is afforded to permit the insertion of the edge of the mirror and also a strip or pad J of felt or similar material forming a cushion against which the mirror is held by the head of the button E as clearly shown in Fig. 3. K is a plate of soft metal such as lead or other suitable material which is placed between the mirror and the adjacent portions of the button E as a protective for the mirror. H is a cup shaped washer arranged on the inner side of the outer portion of the door B and as shown is spot welded at I to the inner side of the outer shell of the door B. The button E passes through an opening in the shell of the door B and is held by the screw G, the head of which rests on the cup shaped washer H.

This construction as will be seen provides a mounting which, while fixedly holding the mirror in place, is sufficiently resilient by reason of the cup shaped washer H and the cushion J to allow for jars to, or expansion and contraction of, either the mirror or the door, or metal parts of the door, without damage to the mirror and at the same time provides for a ready circulation of air between the door and the back of the mirror thereby preventing the accumulation of moisture with the consequent damage to the silver backing of the mirror.

Claims:

1. A glass or mirror mounting fixture composed of a button, an opening arranged in the side of the button adapted to receive a glass or mirror, said opening having walls so arranged as to be substantially parallel with the sides of the glass or mirror adjacent to the walls and resilient means fixedly attached to and holding said button in place on a mirror support.

2. A glass or mirror mounting fixture composed of a member having a slot in one side thereof into which a glass or mirror edge may be placed, said slot having one side adapted to engage and register with the surface of a mirror or glass and the opposite side of said slot being arranged on the opposite side of a glass or mirror, and resilient means fixedly attached to and holding said member in place on a glass or mirror support.

3. A support for glass, mirror or similar articles consisting of a foundation to which the article is to be attached, a member having a slot in one side thereof adapted to enclose a portion of the article on top edge and underside, and resilient means for holding said member in place on the support whereby the article is held fixed to the support.

4. A support for glass, mirror or similar articles consisting of a foundation to which the article is to be attached, a member having a slot in one side thereof adapted to enclose a portion of the article on top edge and underside, means arranged to provide a space between the support and the mirror and resilient means for holding said member in place on the support whereby the article is held fixed to the support.

5. A support for glass, mirror or similar articles consisting of a foundation to which the article is to be attached, a member having a slot in one side thereof adapted to enclose a portion of the article on top edge and underside, a cushion arranged to provide a space between the support and the mirror and resilient means for holding said member in place on the support whereby the article is held fixed to the support.

6. A glass or mirror mounting fixture composed of a button, an opening arranged in the side of the button adapted to receive a glass or mirror, means for resiliently holding said button in place on a mirror support, and a protecting cushion member between the glass or mirror and the button.

7. A glass or mirror mounting fixture composed of a button, an opening arranged in the side of the button adapted to receive a glass or mirror, means for resiliently holding said button in place on a mirror support, and a protecting cushion member of a softer metal than the button between the glass or mirror and the button.

8. A door having openings therethrough, a mirror, clip members extending through the openings in the door from the back and having fingers engaging the mirror, and resilient cushion means fixedly attached to and reacting against the door-back and serving to exert thrust on the clip members behind the door to thereby clamp the mirror by the clip fingers snugly but yieldably against the door.

9. A door having openings therethrough, a mirror, clip members having fingers extending through the openings and engaging the mirror, cushion means fixedly attached to and reacting against the door-back and against parts of the clip members, respectively, to snugly but yieldably clamp the mirror on the door by the clip member fingers, and a flanged cover plate detachably mounted on the door-back and arranged to enclose the parts of the clip members projecting backwardly from the door.

10. A support for a glass, mirror, or a similar article consisting of a foundation to which the article is to be attached, an attaching device consisting of a body portion having means for overlapping the face of the article to be attached to the foundation, a shank portion provided with an opening, a screw threaded member adapted to engage said opening, resilient means fixedly secured to the foundation to engage with said member to resiliently hold an article in a fixed position on the foundation.

11. A door having openings therethrough, a mirror, clip members extending through the openings in the door from the back and having fingers engaging the mirror, and resilient cushion means fixedly secured to and reacting against the door-back to exert thrust on the clip members and means for adjusting the length of said clip members.

12. A door having openings therethrough, a mirror, clip members adjustable in length extending through the openings in the door from the back and having fingers engaging the mirror, and resilient cushion means fixedly secured to and re-acting against the door-back and serving to exert thrust on the clip members behind the door to clamp the mirror snugly but yieldably against the door.

In testimony whereof, I have signed my name to this specification.

HARLEY H. MILLER.